Aug. 4, 1942.   C. C. COONS   2,291,695
REFRIGERATION
Filed Jan. 25, 1939   2 Sheets-Sheet 1

INVENTOR
Curtis C. Coons
BY
Harry S. Dumarer
ATTORNEY

Aug. 4, 1942.    C. C. COONS    2,291,695
REFRIGERATION
Filed Jan. 25, 1939    2 Sheets-Sheet 2

INVENTOR
Curtis C. Coons
BY Harry S'Dumarse
ATTORNEY

Patented Aug. 4, 1942

2,291,695

UNITED STATES PATENT OFFICE 2,291,695

REFRIGERATION

Curtis C. Coons, North Canton, Ohio, assignor to The Hoover Company, North Canton, Ohio, a corporation of Ohio Application January 25, 1939, Serial No. 252,746

23 Claims. (Cl. 62—119.5)

This invention relates to the art of refrigeration and more particularly to a novel absorption refrigerating system of the three-fluid type.

It is well known that the efficiency of the so-called continuous three-fluid absorption refrigerating system can be materially improved if the vapor generated in the boiler thereof is brought into intimate contact with strong solution prior to being conveyed into the condenser. This process, which is known as analyzing, causes condensation of absorption solution vapor generated in the boiler and the heat which was utilized to generate such absorption solution vapor is utilized in the analyzer to generate refrigerant vapor from strong solution. This not only economizes heat but it also materially reduces the possibility of absorption solution finding its way into the condenser and then into the evaporator in which it interferes with evaporation of the liquid.

Various arrangements have been proposed to accomplish this desirable result. These arrangements may generally be divided into two classes, namely, the submerged and non-submerged plate type analyzer. In the submerged analyzer the vapor generated in the boiler is bubbled through strong solution before being conveyed to the condenser. This type analyzer is highly inefficient, it introduces a material and objectionable back pressure on the boiler because of the liquid columns through which the vapor must be forced, and it does not provide sufficiently intimate vapor liquid contact to accomplish the desired result. The plate type analyzer is highly efficiently but it requires an appreciable vertical height in order to provide the necessary period of gas and liquid contact and for that reason its use has not been feasible in absorption refrigerating systems of the type in which the absorption solution is circulated by means of a vapor lift pump.

In previous absorption refrigerating systems of the type in which the absorption solution is circulated by a vapor left pump, the size of the plate type analyzer, if used at all, was too small to give sufficient improvement in the efficiency of the apparatus to justify its use commercially and was generally inherently less efficient than the bubble type analyzer system because of the fact that there was not sufficient space available to realize the advantages of the plate type analyzer.

In previous systems the vapor lift pump was forced to elevate the absorption solution a distance equal to the combined height of the vapor separation chamber, the absorber and the analyzer, if the analyzer were of the non-submerged plate type. As a practical matter, the use of an analyzer either entails too great a load on the pump, too small an absorber or an analyzer so short in vertical height as to be practically worthless.

Previous systems of the three-fluid continuous absorption type regardless of the means utilized to circulate the absorption solution have possessed another disadvantage when used with an analyzer. In previous systems the strongest solution available in the system, namely that discharged from the gas inlet portion of the absorber, has been passed through the analyzer. Now analyzation weakens the solution because of generation of refrigerant vapor therefrom and incorporation of further absorption solution therein. In previous systems, however, this slightly weakened solution has been fed to the boiler, wherefore the boiler was not supplied the strongest available solution.

Accordingly, the present invention proposes a construction and arrangement of absorption refrigerating system of the above referred to type in which a non-submerged plate type analyzer is provided and which is substantially independent of the relative positions of the boiler and absorber.

It is a further object of the invention to provide an absoption refrigerating system of the type above referred to in which the solution elevating mechanism need not elevate the solution any greater distance than the combined boiler-absorber height even though a non-submerged plate type analyzer is incorporated therein.

It is a further object of the invention to provide a system in which the strongest available solution in the system is supplied to the boiler without sacrificing the efficiency and advantages to be derived from the use of a non-submerged plate type analyzer.

Other objects and advantages of the invention will become apparent as the description proceeds when taken in connection with the accompanying drawings, in which.

Figure 1:
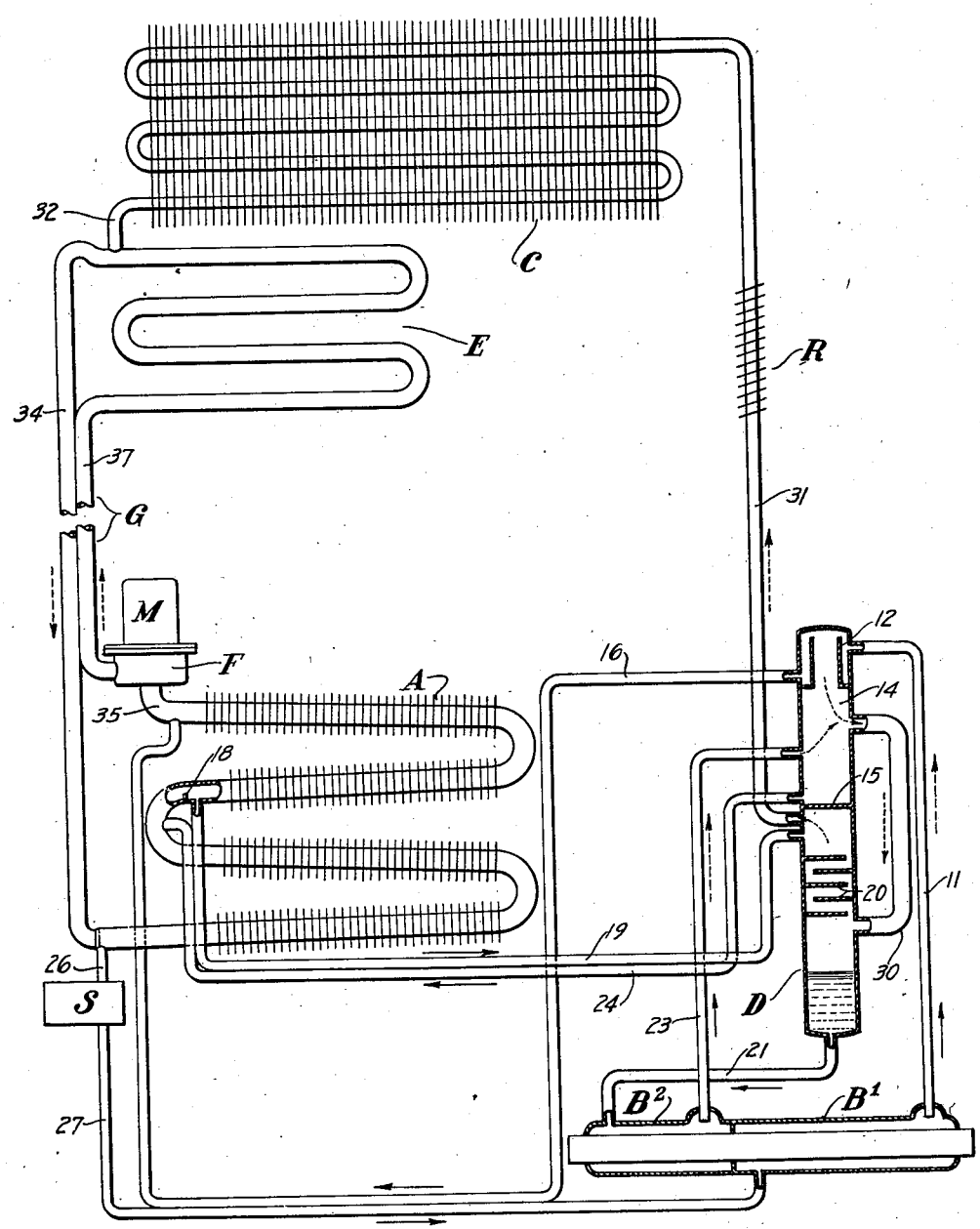
Figure 1 is a diagrammatic representation of a preferred form of the invention.

Referring now to the drawings and to Figure 1 in particular, there is disclosed a three-fluid absorption refrigerating system comprising a double boiler $B^1$ and $B^2$, an analyzer D, an air-cooled rectifier R, a tubular air-cooled condenser C, an evaporator E, a gas heat exchanger G, a tubular air-cooled absorber A, a solution reservoir S, and a circulating fan F which is driven by an electrical motor M. These elements are connected by various conduits to form a plurality of gas and liquid circuits, to which reference will be made in more detail hereinafter, constituting a complete refrigerating system.

The above described system will be charged with a suitable refrigerant, such as ammonia, a suitable absorbent, such as water, and an inert pressure equalizing medium, such as nitrogen or hydrogen.

The boilers may be heated in any suitable manner as by an electrical cartridge heater or a combustible fuel burner. The apparatus will be controlled by governing the energization of the motor M and the heater for the boilers in any suitable or desired manner. A preferred control mechanism is disclosed and claimed in the co-pending application of Curtis C. Coons, Serial No. 148,424, filed June 16, 1937.

The application of heat to the boiler $B^1$ generates refrigerant vapor from the strong solution therein contained. The vapor so generated passes upwardly through a vapor lift pump conduit 11 through which it elevates alternate slugs of weak solution. The refrigerant vapor and the weak solution discharge into a liquid trapping cup 12 formed in the upper portion of a separation chamber 14 which is formed in a continuation of the vessel forming the analyzer D and is separated from the analyzer D by a partition plate 15.

The weak solution discharged into the liquid trapping chamber 12 is conveyed therefrom to the upper portion of the tubular air-cooled absorber A by means of a conduit 16. The weak solution discharged into the upper portion of the absorber A flows downwardly therethrough by gravity in counterflow relationship with a mixture of pressure equalizing medium and refrigerant vapor flowing upwardly through the absorber. The refrigerant vapor content of the mixture is absorbed by the solution and the heat of absorption is rejected to the air flowing over the exterior walls of the absorber vessel and the fins mounted thereon.

This solution flows through the absorber substantially to its mid-point at which point there is provided a small dam 18. The liquid reaching the dam 18 is removed from the absorber into the upper portion of the analyzer D by means of a conduit 19. This moderately strong solution then flows downwardly across the plates 20 formed in the analyzer D in counterflow relationship with refrigerant vapor flowing upwardly thereover. By this process the absorption solution vapor content of the mixture is condensed and the heat of condensation serves to evaporate a certain amount of the refrigerant contained in the strong solution. The thus slightly weakened solution collects in the bottom portion of the analyzer D from which it is conveyed by means of a conduit 21 to the boiler $B^2$. The application of heat to the boiler $B^2$ generates refrigerant vapor from the solution therein contained, which vapor passes upwardly through a vapor lift pump conduit 23 and lifts alternate slugs of weak solution therethrough. The conduit 23 discharges into the vapor separation chamber 14 from which the absorption solution content of the mixture is conveyed into the absorber A at a point slightly below the dam 18 by means of a conduit 24 which is in intimate heat transfer relationship with the conduit 19 previously described.

The weak solution thus supplied to the central portion of the absorber A flows downwardly therethrough in counterflow relationship to the pressure equalizing medium refrigerant vapor mixture absorbing the refrigerant vapor content of the mixture and rejecting the heat of absorption to the cooling air flowing over the exterior walls of the absorber vessel. The strong solution thus formed flows to the bottom point of the absorber from which it is drained through a conduit 26 into the solution reservoir S. The strong solution is then conveyed from the reservoir S to the boiler $B^1$ by means of a conduit 27 which is in intimate heat transfer relationship with the conduit 16 previously described. This completes the absorption solution circuit.

The refrigerant vapor discharged into the chamber 14 by the vapor lift pump conduits 11 and 23 is conveyed therefrom into the analyzer D below the analyzer plates 20 by means of a conduit 30. This vapor passes upwardly across the plates in counterflow relationship to the strong solution supplied to the analyzer by the conduit 19 in a manner previously described. The thus purified refrigerant vapor is then conveyed to the upper portion of the condenser C by means of the conduit 31 which includes the air-cooled rectifier R. The rectifier serves to condense any small quantities of absorption solution vapor which may succeed in passing through the analyzer D.

The refrigerant vapor is then liquefied in the condenser and is conveyed from the bottom portion thereof into the top portion of the evaporator E by means of a conduit 32.

The liquid refrigerant flows downwardly through the evaporator E in counterflow relationship to the lean pressure equalizing medium flowing upwardly therethrough. The refrigerant liquid evaporates into the pressure equalizing medium to produce refrigeration. The rich pressure equalizing medium refrigerant vapor mixture thus formed is conveyed from the top portion of the evaporator E to the bottom portion of the absorber A by means of the conduit 34. The rich mixture then flows upwardly through the absorber, as previously described, and is conveyed from the upper end thereof into the suction inlet of the circulating fan F by means of a conduit 35. The pressure equalizing medium is placed under pressure by the circulating fan and is then returned to the bottom portion of the evaporator E by means of the conduit 37 which is in intimate heat transfer relationship with the conduit 34 previously described.

It will of course be understood that the above described apparatus is only diagrammatically illustrated. Any desired form of heat exchanger may be introduced in the gas lines 34 and 37, the liquid lines 19 and 24, and the liquid lines 16 and 27. Also, the evaporator itself may be of any desired form or configuration consistent with the above described operation of the system. Additionally, if desired, the evaporator may be of the particular type which is disclosed and claimed in the co-pending application of Curtis C. Coons and William H. Kitto, Serial No. 386,395, filed April 2, 1941. In this particular type evaporator the liquid refrigerant and inert gas are each supplied to the bottom portion of the evaporator and the liquid refrigerant is circulated upwardly through the evaporator by the inert gas as it is evaporating thereinto. The absorber may be of any desired type, such as the air-cooled tubular vertical type (as shown), the inclined tubular type, or the cylindrical type which may be air or water cooled.

With a system such as that described above in which a circulating fan is utilized, it is preferable to utilize a dense inert gas, such as nitrogen, as the pressure equalizing medium; however, the instant invention is by no means limited to such a construction though that has been chosen for illustrative purposes. If desired, the circulating fan and its associated motor may be eliminated from the apparatus and the inert gas may be circulated by gravity; that is, due to the density differential existing between the cold rich gas flowing downwardly in the conduit 34 and that of the lean warm gas flowing upwardly through the conduit 37. If free gravity circulation for the inert gas is desired, then a light gas, such as hydrogen, should be selected as the pressure equalizing medium. These are matters which may be selected in any way desired without departing from the spirit or the principles of the present invention.

The operation of this form of the invention, insofar as it has not already been described, is as follows: Due to the fact that the absorption solution which flows through the analyzer flows directly into the boiler but is removed from the absorber at an elevation appreciably above the bottom portion thereof, the non-submerged plate analyzer may extend an appreciable distance above the liquid level prevailing in the boiler system without in any way necessitating that the primary vapor lift pump 11 be called upon to elevate the absorption solution from the level of the boiler to a height equal to the total of the absorber and analyzer. On the contrary, the vapor lift pump 11 need only elevate the absorption solution a distance equal to the combined absorber and boiler heights even though an analyzer of very appreciable height is provided in the system. The secondary vapor lift pump 23 need only elevate the absorption solution supplied to the boiler B² through a vertical distance equal to the combined height of the boiler and of that portion of the absorber below the second lean solution inlet thereto.

An additional feature of the invention resides in the fact that relatively very lean solution is supplied to the absorber at two widely separated points which greatly improve the efficiency thereof. This may be shown by following the path of the liquid discharged by the vapor lift pump 11. This liquid is as lean as it is possible to obtain in systems of this type and accordingly will produce the most efficient absorption. From this it may be seen that the solution elevated through this vapor lift pump 11 is conveyed directly to the gas outlet portion of the absorber and that the solution elevated through the vapor lift pump 23 is conveyed approximately to the mid-portion of the absorber. Moreover, by this arrangement the strongest solution available in the system, namely, that which has just passed out of contact with the most highly charged gas in the system; that is, the gas entering the bottom portion of the absorber, is conveyed directly to the boiler element B¹ which improves the efficiency in a system by bringing this highly concentrated solution directly into the boiler.

Figure 2:
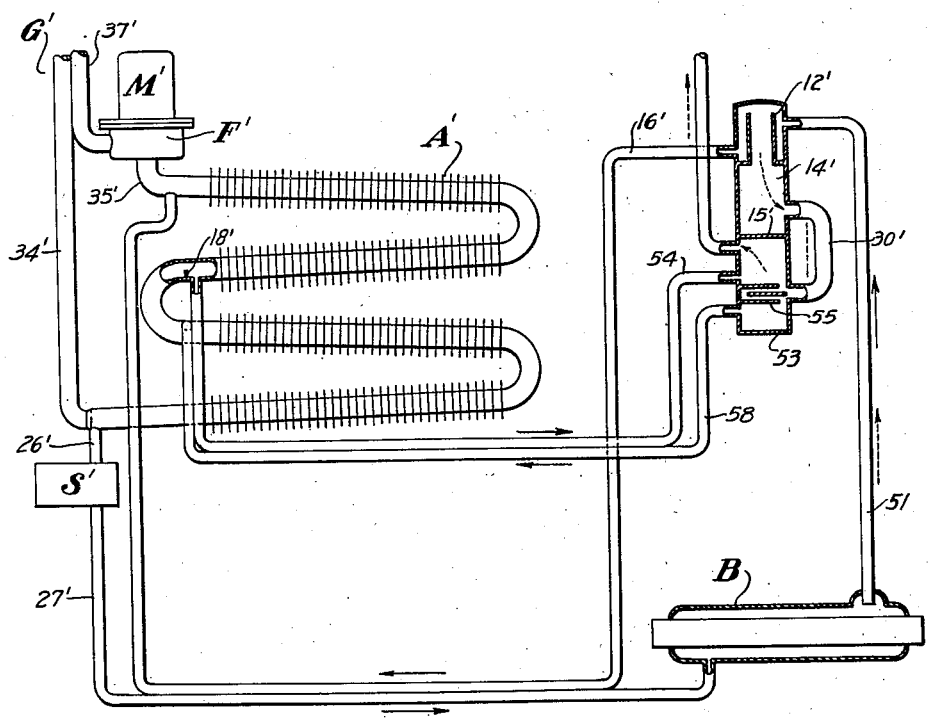
Figure 2 is a fragmentary diagrammatic representation of a modified form of the invention.

The form of the invention illustrated in Figure 2 is designed to be utilized with an absorption refrigerating system of the type in which the solution is circulated by a vapor lift pump but without requiring the use of a double boiler. Certain of the elements disclosed in Figure 2 are identical with elements disclosed in Figure 1 and are given the same reference characters primed.

When heat is applied to the boiler B refrigerant vapor is generated from the strong solution therein contained and passes upwardly through the vapor lift pipe 51 carrying alternate slugs of the weakened solution therewith and discharging into the solution trap 12' in the separation chamber 14'. The solution discharged into the trap 12' is then conveyed through the conduit 16' to the upper portion of the absorber A' through which the solution flows by gravity in counterflow relationship to the pressure equalizing medium refrigerant vapor mixture in the manner described in connection with Figure 1.

The solution trapped behind the dam 18' is conveyed from the absorber into the analyzer 53 by means of a conduit 54. This solution flows downwardly over the analyzer plates 55 in counterflow to refrigerant vapor which is supplied to the analyzer 53 above the level of the plates 55 by the conduit 30' which connects to the separation chamber 14'. The analyzing solution which collects in the bottom of the analyzer 53 is then returned to the absorber at a level below the level at which the pipe 54 connects thereto by means of a pipe 58 which is in heat transfer relationship with the pipe 54. The thus weakened solution which is returned to the absorber then flows downwardly therethrough in counterflow to the pressure equalizing medium refrigerant vapor mixture and is returned to the boiler by way of the conduit 26', the solution reservoir S' and the conduit 27' which is in heat exchange relationship with the conduit 16'.

The pressure equalizing medium circuit to be used in conjunction with this form of the invention is identical with that illustrated and described in connection with Figure 1 and need not be described in detail again.

In the operation of this form of the invention the analyzer cannot be made quite as deep as is possible with the form of the invention illustrated in connection with Figure 1 but its efficiency is relatively high because of the fact that it is supplied with relatively strong solution and returns a weakened solution to the absorber which of course permits the stronger solution, that is, that found at the bottom portion of the absorber, to flow directly into the boiler. The accumulative effect of these features appreciably improves the efficiency of the system and utilizes the analyzing action to the utmost.

Accordingly, this invention proposes an arrangement whereby three-fluid refrigerating systems of all types utilizing vapor lift pump absorption solution circulation may be arranged in such fashion that the advantages of a plate type analyzer are realized, in such fashion that the analyzer serves to weaken the absorption solution approximately midway of its flow to the absorber with resulting improvement in the efficiency of the absorber, and which further discharges the strongest solution found anywhere in the system into the boiler while retaining the advantages of a non-submerged plate analyzer. Furthermore, in one form of the invention the above described features are further combined with an arrangement which also permits a very deep plate-type analyzer to be utilized without requiring that the vapor lift pump elevate the solution through a height greater than that which would be required if the analyzer were not utilized. In the form of the invention illustrated in Figure 1 the solution which is returned to the mid-point of the absorber is as weak as that which was initially supplied to the gas outlet portion thereof which of course very materially improves the efficiency of the absorption process.

With substantially vertical absorbers or those inclined only a relatively small distance from the vertical, the form of the invention illustrated in Figure 2 also possesses the advantage that it permits the use of a non-submerged plate type analyzer without imposing an additional lifting load upon the vapor lift pump. Relatively very little absorption occurs in the return bend portions of tubular type absorbers and an analyzer of this height can be utilized to very great advantage in the manner illustrated without increasing the height to which the absorption solution must be initially elevated as it leaves the boiler.

In each form of the invention, but particularly in the form illustrated in Figure 2, a plurality of serially connected analyzers may be utilized if desired. In this event an analyzer would be connected across each of the return bend portions of the absorber and the refrigerant vapor would be led through them progressively.

While the invention has been illustrated and described herein in considerable detail, it is not limited thereto as various changes may be made in the construction, arrangement and proportion of parts without departing from the spirit of the invention or the scope of the appended claims.

I claim:

1. That improvement in the art of refrigeration which includes the steps of applying heat to a solution of a refrigerant in an absorbent to generate refrigerant vapor therefrom, liquefying such vapor, evaporating such liquid to produce refrigeration, conveying the resulting vapor into an absorption zone, contacting the vapor in the absorption zone with solution previously weakened by the generation of refrigerant vapor therefrom, removing resulting partially strengthened solution from one portion of the absorbing zone and passing the same into intimate contact with freshly generated refrigerant vapor and absorbent vapor to weaken the solution by expulsion of refrigerant vapor and by addition of absorbent removed from the refrigerant vapor, returning the resulting weakened solution to another portion of the absorption zone into contact with the refrigerant vapor produced in the evaporating zone to again strengthen the solution and then generating fresh refrigerant vapor from the strengthened solution.

2. Absorption refrigerating apparatus comprising a pressure equalizing medium circuit including an evaporator and an absorber, a boiler, means for liquefying vapors generated in said boiler and for supplying the same to said evaporator, a heat-operated pumping mechanism for elevating weakened solution from said boiler into said absorber, means for removing solution from an intermediate portion of said absorber and for flowing the same into intimate contact with freshly generated refrigerant vapor, and means for returning such solution to said absorber.

3. Absorption refrigerating apparatus comprising a pressure equalizing medium circuit including an evaporator and an absorber, a boiler, means for liquefying vapors generated in said boiler and for supplying the same to said evaporator, a heat-operated pumping mechanism for elevating weakened solution from said boiler into said absorber, means for removing solution from an intermediate portion of said absorber and for flowing the same into intimate contact with freshly generated refrigerant vapor, means for generating further refrigerant vapor from the solution which has passed into contact with freshly generated vapor, and means for returning such solution to said absorber.

4. Absorption refrigerating apparatus of the three-fluid type including an absorber having a plurality of parts, a plurality of generators, a heat operated pump for conveying weakened solution from a first one of said generators into a first part of said absorber, means for removing solution from said first part of said absorber and for bringing the same into contact with vapor generated in said first generator, means for then conveying the removed solution to a second one of said generators, a vapor lift pump for conveying the weak solution from said second generator into a second part of said absorber, and means for returning the solution discharged from said second part of said absorber to said first generator.

5. Absorption refrigerating apparatus of the three-fluid type including an absorber having a plurality of parts, a plurality of generators, a heat operated pump for conveying weakened solution from a first one of said generators into a first part of said absorber, means for removing solution from said first part of said absorber and for bringing the same into contact with vapor generated in said generators, means for then conveying the removed solution to a second one of said generators, a vapor lift pump for conveying the weak solution from said second generator into a second part of the absorber, and means for returning the solution discharged from the second part of the absorber to said first generator.

6. Absorption refrigerating apparatus including a generator, an absorber, a vapor lift pump constructed and arranged to convey weakened solution from the generator to the upper portion of the absorber, means for removing solution from said absorber at a first level and for contacting the same with vapor discharged from said vapor lift pump, and means for returning such solution to a lower level of the absorber.

7. Refrigerating apparatus including a generator, an absorber having a plurality of sections at different elevations, a pump for elevating weakened solution from said generator to an upper section of the absorber, means for conveying solution from the lower portion of said upper section of said absorber into contact with vapor discharged from the generator, and means for returning the solution which has contacted the vapor discharged from the generator to a lower section of said absorber.

8. Absorption refrigerating apparatus comprising a boiler, an evaporator, an absorber, means for supplying refrigerant vapor generated in said boiler to said evaporator in liquid phase, means for conveying refrigerant vapor from said evaporator to said absorber, means for conveying absorption solution from said boiler to said absorber, means for removing part of the refrigerant content of the solution after it has traversed a portion of said absorber, and means for conveying the enriched solution to the boiler after it has traversed the entire absorber.

9. Absorption refrigerating apparatus comprising a boiler, an evaporator, an absorber, a pressure equalizing medium circuit including said evaporator and absorber, means for supplying refrigerant vapor generated in said boiler to said evaporator in liquid phase, means included in said pressure equalizing medium circuit for conveying refrigerant vapor from said evaporator to said absorber, means for conveying absorption solution from said boiler to said absorber, means for removing solution from contact with pressure equalizing medium and refrigerant vapor after it has traversed a portion of said absorber and for expelling refrigerant therefrom to weaken the solution, means for returning the weakened solution to the absorber to traverse the remaining portion thereof, and means for conveying the resulting enriched solution to the boiler.

10. Absorption refrigerating apparatus comprising primary and secondary generators, an evaporator, an absorber, means for supplying refrigerant vapor produced in said generators to said evaporator in liquid phase, means for conveying refrigerant vapor from said evaporator to said absorber, means for conveying the solution from the primary generator to the absorber, means for conveying the solution from an intermediate portion of the absorber into contact with refrigerant vapor produced by said generators, means for conveying the solution which has contacted the refrigerant vapor into the secondary generator, means for conveying weak solution from the secondary generator to an intermediate portion of the absorber, and means for conveying the resulting strong solution to said primary generator.

11. That improvement in the art of refrigeration which includes the steps of generating refrigerant vapor from a solution of refrigerant in an absorbent, liquefying the refrigerant vapor, evaporating the liquid to produce refrigeration, passing the vapor produced by evaporation into an absorbing zone, absorbing part of the vapor in the absorption solution, weakening the absorption solution by exchanging refrigerant vapor for absorption solution vapor between the absorption solution and freshly generated vapor of refrigerant and absorption solution while the absorption solution is out of contact with vapor produced by evaporation, absorbing the balance of the refrigerant vapor produced in the evaporator in the weakened solution, and generating further refrigerant vapor from the resulting rich solution.

12. Absorption refrigerating apparatus including means for generating refrigerant vapor, an absorber extending downwardly substantially to the liquid level of the generating means, a vapor lift pump for conveying solution from said generating means to said absorber, a non-submerged contact type analyzer in open communication with said generator, means for withdrawing solution from said absorber and for supplying such solution to said analyzer, and means for returning the solution which has passed through said analyzer to said absorber.

13. That improvement in the art of absorption refrigeration which includes the steps of applying heat to a solution of refrigerant in an absorbent in a generating zone to produce refrigerant vapor, conveying the weakened solution into an absorbing zone, flowing the solution through the absorbing zone, reducing the refrigerant content of the solution before it has passed through the entire absorbing zone by withdrawing the solution from the absorption zone and expelling refrigerant therefrom and then returning the solution to the absorption zone, and conveying strong solution from the absorbing zone to the generating zone.

14. That improvement in the art of absorption refrigeration which includes the steps of applying heat to a solution of refrigerant in an absorbent in a generating zone to produce refrigerant vapor, conveying the weakened solution into an absorbing zone, flowing the solution through a portion of the absorbing zone, removing the solution from the absorbing zone and contacting it with the vapor produced in the generating zone, returning the solution to the absorbing zone, and conveying strong solution from the absorbing zone to the generating zone.

15. That improvement in the art of absorption refrigeration which includes the steps of applying heat to a solution of refrigerant in an absorbent in a generating zone to produce refrigerant vapor, conveying the weakened solution into an absorbing zone, flowing the solution through a portion of the absorbing zone, removing the solution from the absorbing zone and contacting it with the vapor produced in the generating zone, passing the solution through a second heated generating zone to produce additional refrigerant vapor, returning the solution to the absorbing zone, and conveying strong solution from the absorbing zone to the first-mentioned generating zone.

16. Absorption refrigerating apparatus comprising a generator, an absorber, means for elevating solution from said generator into said absorber, said absorber extending downwardly substantially to the liquid level of said generator, a non-submerged contact type analyzer positioned at a level above the level of the bottom portion of said absorber and in open communication with said generator, and means for conveying absorption solution from an intermediate part of said absorber through said analyzer into contact with refrigerant vapor produced by said generator and for returning such solution to said intermediate portion of said absorber.

17. That improvement in the art of refrigeration which includes the steps of applying heat to a solution of a refrigerant in an absorbent in a first place of heating to expel refrigerant vapor, conveying the solution from which refrigerant vapor has been expelled from the first place of heating to a place of absorption, contacting the solution in the place of absorption with refrigerant vapor to add refrigerant to the solution, withdrawing the solution from the place of absorption and heating the withdrawn solution in a second place of heating to expel refrigerant vapor therefrom, conducting the withdrawn solution to a place of absorption and into contact with refrigerant vapor for again adding refrigerant to the solution and then returning the solution to the first place of heating.

18. That improvement in the art of refrigeration which includes the steps of applying heat to a solution of a refrigerant in an absorbent in a place of heating to expel refrigerant vapor, conveying the solution from which refrigerant vapor has been expelled to a place of absorption, contacting the solution in the place of absorption with refrigerant vapor to add refrigerant to the solution, withdrawing the solution from the place of absorption and contacting the withdrawn solution with freshly generated refrigerant vapor which is at a temperature intermediate the boiling points of the refrigerant and the absorbent, conveying the withdrawn solution to a place of absorption and into contact with refrigerant vapor for again adding refrigerant to the solution, and then returning the solution to said place of heating.

19. That improvement in the art of refrigeration which includes the steps of applying heat in a first place of heating to a solution of a refrigerant in an absorbent to expel refrigerant vapor, conveying the solution from which refrigerant vapor has been expelled to a place of absorption, contacting the solution in the place of absorption with refrigerant vapor to add refrigerant to the solution, withdrawing the solution from the place of absorption and contacting the withdrawn solution with freshly generated refrigerant vapor which is at a temperature intermediate the boiling points of the refrigerant and the absorbent, then applying heat to the wihdrawn solution in a second place of heating to expel refrigerant vapor therefrom and conducting the withdrawn solution to a place of absorption and into contact with refrigerant vapor for again adding refrigerant to the solution.

20. That improvement in the art of refrigeration which includes the steps of applying heat to a solution of a refrigerant in an absorbent in a place of heating to expel refrigerant vapor, conveying the solution from which refrigerant vapor has been expelled to a place of absorption, contacting the solution in the place of absorption with refrigerant vapor to add refrigerant to the solution, conveying a first body of solution from said place of absorption and contacting said first body of solution with freshly generated refrigerant vapor, returning said first body of solution to said place of absorption, and conveying another body of solution from said place of absorption to said place of heating.

21. That improvement in the art of refrigeration which includes the steps of applying heat to a solution of a refrigerant in an absorbent in a first place of heating to expel refrigerant vapor, conveying the solution from which refrigerant vapor has been expelled from the first place of heating to a place of absorption, contacting the solution in the place of absorption with refrigerant vapor to add refrigerant to the solution, removing a first body of solution from said place of absorption, contacting said first body of solution with freshly generated refrigerant vapor, heating said first body of solution in a second place of heating to expel refrigerant vapor, returning said first body of solution to said place of absorption, removing a second body of solution from said place of absorption, heating said second body of solution in said first place of heating and returning said second body of solution to said first place of absorption.

22. That improvement in the art of refrigeration which includes the steps of applying heat to a solution of a refrigerant in an absorbent in a plurality of places of heating to expel refrigerant vapor therefrom, conveying the solution from which refrigerant vapor has been expelled from said places of heating to a place of absorption, contacting the solution in the place of absorption with refrigerant vapor to add refrigerant to the solution, conveying a first body of solution from said place of absorption into contact with freshly generated refrigerant vapor in a place of analyzation, conveying the solution from said place of analyzation to one of said places of heating, and conveying another body of solution from said absorber to another one of said places of heating.

23. In an absorption refrigerating apparatus of the three-fluid type, an absorber, a plurality of generators, means for heating said generators, an analyzer, means for conveying solution from said generators to said absorber, means for conveying solution from said absorber to said analyzer, means for conveying solution from said analyzer to one of said generators, means for conveying solution from said absorber to another one of said generators, and means for conveying refrigerant vapor from said generators to said analyzer.

CURTIS C. COONS.